United States Patent [19]

Gitlitz et al.

[11] Patent Number: 4,593,055

[45] Date of Patent: Jun. 3, 1986

[54] ERODIBLE SHIP-BOTTOM PAINTS FOR CONTROL OF MARINE FOULING

[75] Inventors: Melvin H. Gitlitz, Edison; Howard H. Leiner, Cranbury, both of N.J.

[73] Assignee: M&T Chemicals Inc., Woodbridge, N.J.

[21] Appl. No.: 763,376

[22] Filed: Aug. 7, 1985

Related U.S. Application Data

[63] Continuation-in-part of Ser. No. 619,167, Jan. 17, 1984, which is a continuation-in-part of Ser. No. 458,377, Jan. 17, 1983, abandoned.

[51] Int. Cl.$^4$ ............... C08L 31/00; C08L 31/02; C09D 5/14

[52] U.S. Cl. .................... 523/122; 523/177; 106/16; 106/15.05; 524/547; 427/385.5; 427/388.2

[58] Field of Search .................. 523/177, 122; 106/16, 106/15.05; 524/547; 427/385.5, 388.2

*Primary Examiner*—John Kight
*Assistant Examiner*—M. L. Moore
*Attorney, Agent, or Firm*—S. H. Parker; J. Matalon; R. E. Bright

[57] ABSTRACT

A film-forming, water insoluble seawater erodible antifouling paint is described which is characterized by including a hydrolyzable organosilyl acrylate copolymer therein.

19 Claims, No Drawings

ERODIBLE SHIP-BOTTOM PAINTS FOR CONTROL OF MARINE FOULING

CROSS-REFERRENCE TO RELATED APPLICATIONS

This application is a continuation-in-part of application Ser. No. 619,167, filed Jan. 17, 1984, which is, in turn, a continuation-in-part of application Ser. No. 458,377, filed Jan. 17, 1983, and now abandoned.

FIELD OF THE INVENTION

This invention relates to marine antifouling paints which erode at an effective rate, and, more particularly, to a copolymer binder for an antifouling paint which includes an organosilyl moiety which hydrolyzes effectively in the presence of sea water.

BRIEF DESCRIPTION OF THE PRIOR ART

The superiority of antifouling paints based on organotin acrylate polymers over the old, conventional leaching type systems has been established by the major ship owners and marine paint companies. Such paint systems offer superior antifouling performance over extended periods because of a constant release of toxicant from the surface of the paint film by hydrolysis of the organotin acrylate copolymer in seawater, normally slightly alkaline.

In paint systems of this kind, the organotin acrylate copolymer serves as the film-forming component (binder).

The organotin portion of the copolymer provides a site for hydrolysis of the polymer by seawater (app. pH=8.0 to 8.3), by which process the polymer surface is slowly converted to a water-soluble or water-swellable form which is able to be eroded away by moving seawater and expose a fresh paint surface.

In addition, the hydrolysis of the organotin polymer releases bis-tributyltin oxide, an effective antifouling toxicant.

In practice, additional toxicants are usually physically incorporated into the antifouling paint. These cotoxicants are released during the gradual hydrolysis and erosion of the organotin copolymer vehicle and serve to provide additional protection against fouling. An additional advantage claimed for such systems is fuel savings which results from a reduction in surface roughness as a consequence of water-planing or erosion of the paint film. Such systems can be designed to hydrolyze and erode at high or low rates by incorporating a retarder characterized by having a low seawater solubility as described in Milne and Hails, U.S. Pat. No. 4,021,392.

The mechanism by which organotin copolymer antifouling paints function is described in *Journal of Coatings Technology*, Vol. 53, Number 678, pages 46–52. Such paints, however, are relatively expensive and possess undesirable irritative properties due to the necessary presence of the hydrolyzable tributyltin moiety.

These paints represent a major improvement over the conventional, leaching-type paints wherein the cuprous oxide toxicant is dispersed in a binder consisting of a mixture of a film-forming insoluble resin and a water sensitive or slowly water-soluble component such as gum rosin.

Such conventional paint systems, however, fail to provide a constant toxicant release and, moreover, do not erode in service. This is due to the selective extraction of the water-soluble component and consequent leaching of toxicant (cuprous oxide) from the interior of the paint film. A matrix of the insoluble vinyl resin component remains behind after the water-soluble component of the film (gum rosin) is leached away. Moreover, the spent paint film no longer controls fouling even though it might contain up to 30–40% of the initial level of cuprous oxide because water penetration required for leaching the copper to the surface is limited through the matrix of residual vinyl resin. Spent antifouling systems of this type do not provide a suitable base for repainting since they possess poor mechanical proper- ties due to the voids in the film which result in poor adhesion of the new paint film.

Prior art attempts to incorporate toxicants into water soluble polymers and to use these as antifouling paints have also failed to produce the desired results. Such paints swell in seawater and cannot be expected to provide good mechanical properties and uniform control of fouling since the whole paint film is weakened on prolonged water immersion. Even such paint compositions as described in British Patent Specification No. 1,584,943 do not provide optimum control of fouling because the paint binder consists of a physical mixture of water insoluble and synthetic watersoluble polymeric binders wherein the synthetic watersoluble polymeric binder is substituted for the natural gum rosin of the previously described paint system. In the paint systems of British Patent Specification No. 1,584,943, the watersoluble polymeric component can be selectively extracted from the binder system by seawater leading to the same problems encountered with traditional vinyl/-rosin systems. Moreover, on prolonged immersion in water, some portion of the water-soluble resin component can cause the film to absorb water and swell through out its thickness yielding a film with poor mechanical properties.

Simple acrylate ester copolymers are described in U.S. Pat. No. 4,407,997 as vehicles for paints which are gradually planed away by moving seawater. However, for such paints to surface erode, a major proportion of the pigment used must be a water-sensitive metalliferous pigment. In addition, such coatings must contain from 35–50% by volume of pigment with the higher levels being preferred. Highly insoluble pigments retard the dissolution of the paint film and must be kept below certain specified levels. It is thus evident that the pigment content is being dictated by the required dissolution rate. The ability of the pigment content to control dissolution is claimed to be improved by the use of low molecular weight polymer as the paint binder as well as by the incorporation of hydrolyzable tributyltin acrylate groups into the polymer chain. These facts are consistent with the known water resistance of poly(-methyl acrylate) films which as described in Kirk-Othmer Encyclopedia of Polymer Science and Technology (Vol. 1, pages 246–328, 1964), are only slightly attacked even by strong aqueous solutions of sodium hydroxide or sulfuric acid at room temperature. Thus, those paints described in British Patent Application No. 2,087,415A are much less dependent on the nature of the polymeric binder than on the high levels of water-sensitive pigments present. These pigments can be leached out by sea-water and the resulting empty matrix film, now devoid of reinforcing pigment particles, can be sufficiently weakened to be planed away by moving seawater. This method for protecting against surface growth is similar to the method by which chalking or self-cleaning mildew-resistant exterior house paints are obtained by the incorporation of zinc oxide and hydrophilic anatase titanium dioxide into paints based on acrylic or polyvinyl acetate resin polymers as described in *J. Paint Technology,* Vol. 46, No. 594 (July 1974), page 33. Such paints would be expected to have poor mechanical properties such as would make them unsuitable for underwater use for prolonged periods of time.

Further background is found in European patent application No. 0069559, published January 12, 1983, which discloses that although triorganotins are effective anti-fouling agents, they are expensive to employ and there are some circumstances where the release of triorganotin ions is preferably avoided or reduced while still obtaining the benefits of smoothing of the paint in service by an erosion mechanism. The patent application discloses the substitution of quinolinyl (or substituted quinolinyl) groups for the organotin groups in acrylate copolymers. The approach of this disclosure is to replace one expensive toxicant with another but it fails to provide a means for controlling the erosion rate which is independent of the toxicant concentration.

SUMMARY OF THE INVENTION

In accordance with the present invention, an antifouling paint is provided which includes a copolymer binder resulting from the copolymerization of one or more copolymerizable ethylenically unsaturated monomers and a monomer having a functional group which produces an organosilyl acrylate copolymer which is hydrolyzable in seawater.

The antifouling paint herein includes a toxicant and a copolymer binder. The copolymer binder is film-forming, water insoluble, seawater erodible and is represented by the formula

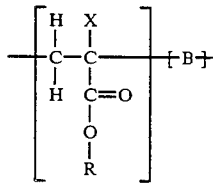

wherein
X is H or $CH_3$;
R is a substantially non-bioactive, hydrolyzable organosilyl moiety; and B is the residue of an ethylenically unsaturated monomer.
R is selected from the group consisting of:

$-SiR_nR'_{3-n}$ or $-Si(OR_nR'_{3-n})_3$;

wherein R' and R'' are independently straight or branched chain alkyl $C_1$-$C_{10}$, or phenyl; and n=0–3.

The copolymer of the present invention itself can serve entirely as a toxicant delivery system, and is not dependent upon the hydrolysis of an organotin or bioactive component containing polymer. Thus, an effective antifoulant can be incorporated directly into the paint.

DETAILED DESCRIPTION OF THE INVENTION

Superior control of fouling on shipbottoms is achieved herein by the use of coatings based on copolymers which slowly hydrolyze in seawater, and an inorganic or organic toxicant which is slowly released as the organic polymeric binder is hydrolyzed. The paint is produced from a binder polymer resulting from the copolymerization of (1) at least one acrylic or methacrylic ester having a functional group which produces a polymer which is hydrolyzable in seawater and (2) one or more copolymerizable ethylenically unsaturated monomers.

It can be shown that conventional acrylate esters, e.g., ethyl acrylate, methyl methacrylate and butyl acrylate do not hydrolyze at a sufficient rate to be used in achieving a carboxylate containing polymer, which is sufficiently sensitive to erosion by the action of seawater, to produce an antifouling paint.

However, it is possible to modify the ester to produce enhanced hydrolytic sensitivity of the polymer. This can be accomplished by providing a functional group which enhances the attack by hydroxyl ions or by weakening the ester bond.

The hydrolytically active monomer is represented by the formula:

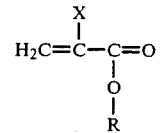

wherein
X is hydrogen or a methyl group; and
R is $-SiR_nR'_{3-n}$ or $-Si(OR_nR'_{3-n})_3$, where R' and R'' are straight or branched chain alkyl $C_1$-$C_{10}$, or phenyl. Representative compounds include tributylsilyl acrylate, triphenylsilyl acrylate, phenyldimethylsilyl acrylate, diphenylmethylsilyl acrylate, tri-isopropylsilyl acrylate and trimethylsilyl acrylate, and the corresponding methacrylates.

It should be noted that reference to the monomer is not intended to indicate that the polymer must be synthesized by copolymerization of a particular monomer with a comonomer. For example, the polymer can be produced by adduction to a preformed acrylic or methacrylic acid polymer. The resultant polymer will include a recurring group represented by the structure.

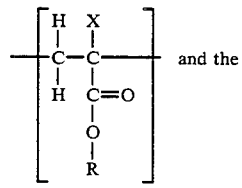 and the recurring group will correspond to a monomer

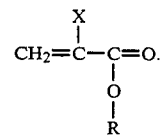

The paint formulation includes the polymeric binder, a solvent, a toxicant and can include a water sensitive pigment component, which can be a toxicant, inert pigments and fillers along with a retarder. U.S. Pat. No. 4,260,535, British No. 2,087,415A and U.S. Pat. No. 4,191,579 are noted to contain descriptions of typical paint components and are incorporated by reference.

Antifouling toxicants include tributyltin fluoride, triphenyltin hydroxide, triphenyltin fluoride, tributyltin oxide, triphenyltin chloride, $Cu_2O$, ZnO, dithiocarbamate derivatives and cuprous thiocyanate.

The paint formulation employs sufficient solvent to enable the system to be applied to the surface to be protected. The pigment volume concentration (PVC) should be in the 10 to 50 range, and preferably is from about 30 to 45.

The upper limit for the hydrolysis of the copolymer used in the paint is not of critical importance because even with an excessively rapidly hydrolyzing copolymer, a desired erosion rate can be achieved by proper selection of the ratio of functional group to polymer or copolymer or the use of a retarder as disclosed in U.S. Pat. Nos. 4,021,392; 4,260,535; and British Patent No. 1,589,246, the disclosures of which are incorporated herein by reference.

The erosion rate of the paint is dependent upon the total contributions of the functional group, the comonomer and other components, such as toxicant(s), pigment(s), retarder(s), fillers, inerts or other nonvolatile components of the paint.

The functional group of the present invention can work in conjunction with known erosion rate controls or in place of known means to regulate the erosion rate.

The amount of the hydrolyzable organosilyl silyl acrylate or methacrylate to the non-hydrolyzing, ethylenically-unsaturated comonomer, on a mole basis, in 100 parts of the copolymer, is from 10 to 80 parts; and preferably 25 to 40 parts of the organosilyl acrylate or methacrylate.

The ethylenically unsaturated comonomers are well known in the film forming art and are identified for example, in British No. 2,087,415A, page 1, lines 56 to 59, and U.S. Pat. No. 4,021,392, column 4, lines 33 to 41, the disclosures of which are incorporated by reference.

The superior control of the erosion rate relies on chemically tailoring the polymer so that it is selectively weakened at certain points pendant to the polymer chain at the paint/water interface. These weak links are slowly attacked by seawater allowing the polymer to gradually become seawater soluble or seawater swellable. This weakens the hydrolyzed surface polymer film to such an extent that moving sea-water is able to wash off this layer and thus expose a fresh surface. By way of contrast with the prior art systems, in the system of the present invention the paint is relatively impermeable to seawater until hydrolysis of the outer microlayer takes place. The hydrolyzed microlayer is then sequentially removed by the water "friction".

A portion of the monomeric units are provided with functional groups which provide a site of weakness, that is, sites which tend to hydrolyze in the presence of seawater. The ratio of functionalized monomers to non-functionalized monomers is controlled to provide control of the erosion rate. Thus, unlike the system of the British Patent Application No. 2,087,415A which relies on the presence of high levels of water-sensitive pigments to provide erosion, the system of the instant invention is controlled by the levels and ratio of functional and inert monomers used to prepare the polymer.

EXAMPLE 1

Synthesis of Organosilyl Acrylate and Methacrylate Ester Monomers from Acrylic Acid or Methacrylic Acid and an Organohalosilane The general procedure for the synthesis of the functional organosilyl acrylates and methacrylates ester monomers is shown in the following example.

Preparation of Triisopropylsilyl Acrylate Monomer 72.1 g (1 mol) of glacial acrylic acid, 101.2 g (1 mol) of triethylamine 0.072 g of methoxyphenol and 300 ml of xylene is added to a four-neck, round bottom flask equipped with a stirrer, condenser, nitrogen inlet, thermometer and dropping funnel. Under a nitrogen blanket, a solution of 192.8 g (1 mol) of triisopropylchlorosilane in 100 ml of xylene is slowly added to the rapidly stirred reactants at room temperature. The temperature is permitted to rise to a maximum temperature of 55° C. and this temperature is maintained with cooling if necessary.

The reactants are held at 50°–55° C. for 5 hours after addition is complete and the extent of reaction is followed via gas chromatography. The precipitated triethylamine hydrochloride (66 g.) is filtered off a dry nitrogen atmosphere; washed twice with dry toluene, and the wash solvent is added to the filtrate. The toluene solvent and unreacted reagents are removed with a rotary evaporator and a vacuum pump; and the product is distilled under reduced pressure, collected and stored in the presence of 1,000 ppm of methoxyphenol under $N_2$. 106.5 g of crude product is recovered. After distilling at 0.4 mm Hg, 93.5 g of a clear, water-white product boiling at 65°–67° C. is collected which is identified as the desired product with a purity of 97.5% (by gas chromatography).

EXAMPLES 2–8

Following the procedure of Example 1, the following organosilyl acrylates were prepared using equivalent quantitites of the corresponding organohalosilane in place of tri-isopropylchlorosilane.

| Example | Triorganosilyl acrylate |
| --- | --- |
| 2 | Trimethylsilyl acrylate |
| 3 | t-Butyldimethylsilyl acrylate |
| 4 | t-Butyldiphenylsilyl acrylate |
| 5 | Phenyldimethylsilyl acrylate |
| 6 | Diphenylmethylsilyl acrylate |
| 7 | Trihexylsilyl acrylate |
| 8 | Tributylsilyl acrylate. |

EXAMPLE 9

Polymer Preparation

Preparation of Triisopropylacrylate Copolymer

The solution polymerization of a 30 mole percent triisopropylsilyl acrylate (TIPSA), 70 mole percent methylmethacrylate (MMA) copolymer is carried out as follows:

| Ingredients | Charge (g.) |
| --- | --- |
| TIPSA Monomer | 80.6 |
| MMA | 70.1 |
| Vazo 64[1] | 1.0 |

| Ingredients | Charge (g.) |
| --- | --- |
| Xylene | 127.6 |

[1] DuPont's azobisisobutyronitrile polymerization initiator.

Procedure (1) All ingredients are charged to a 250 ml three neck resin flask containing a stainless steel stirrer, condensor, nitrogen inlet, a thermometer with a temperature sensing-controlling head attached, and a resistance heater.

(2) under a nitrogen atmosphere, the solution is heated to 85° C. in 1 hour, held for 5 hours, cooled to below 30° C., and packaged.

EXAMPLE 10

Measurements of the Rate of Hydrolysis of Copolymer Films

The copolymer hydrolysis rate is determined in accordance with the following procedure.

The hydrolysis of polymer films in pH=9 water at 35° C. was measured by back titrating the polymer free acid with standardized potassium hydroxide at 24 hour intervals using the procedure described below:

Hydrolyses were conducted in a single neck, 300 ml flask, stirred by a $\frac{3}{4}''$ Teflon coated magnetic stirrer, immersed in a thermostatically-controlled water bath at 25°±0.5° C. under an inert atmosphere obtained by bubbling nitrogen below the surface of the resin-water mixture for about one-fourth hour and then sealing the flask. The flask contained 150 ml of distilled water at a pH of 9.00-9.02 with KOH, 0.5 g of activated charcoal and 5.0 g of vacuum dried polymer film pulverized in a Waring blender for 20-30 seconds. Every 24 hours the contents of the flasks were back-titrated to pH 9.00-9.02 with standardized KOH and the number of milliequivalents used was calculated. The test was terminated after five consecutive titrations.

The following Table shows the results of the copolymer hydrolysis test. Copolymers which show hydrolysis rates above $5 \times 10^{-4}$ meg/hr are effective as binders for water-insoluble sea-water erodible antifouling paints.

TABLE
HYDROLYSIS OF REPRESENTATIVE ORGANOSILYL ACRYLATE POLYMERS

| Organosilyl Acrylate Component in Copolymer | (mol percent) | Hydrolysis Rate (Meq. × $10^4$/hr.) |
| --- | --- | --- |
| Tributylsilyl acrylate | 30 | 785* |
| Trihexylsilyl acrylate | 30 | — |
| Phenyldimethylsilyl acrylate | 40 | 1,055 |
| Phenyldimethylsilyl acrylate | 33 | 999 |
| Phenyldimethylsilyl acrylate | 30 | 820* |
| Phenyldimethylsilyl acrylate | 25 | 864 |
| Diphenylmethylsilyl acrylate | 40 | 1,570 |
| Diphenylmethylsilyl acrylate | 33 | 1,426 |
| Diphenylmethylsilyl acrylate | 30 | 630* |
| Diphenylmethylsilyl acrylate | 20 | 988 |
| Triisopropylsilyl acrylate | 30 | 73* |
| Trimethylsilyl acrylate | 40 | 1,421 |
| Trimethylsilyl acrylate | 33 | 1,090 |
| Trimethylsilyl acrylate | 25 | 808 |

*No activated charcoal in test

EXAMPLE 11

Antifouling Paints

Paints containing low and high levels of cuprous oxide, an accepted antifoulant and based on representative hydrolyzable polymers exhibiting suitable hydrolysis rates were prepared and tested for fouling resistance. The test paint compositions and method of preparation are described below.

| Ingredient | grams/liter of paint |
| --- | --- |
| Diglyme solvent | 249.7 |
| Fumed Silica | 18.1 |
| Organosilyl acrylate copolymer of Ex. 1 (33% solution in xylene) | 523.7 |
| Cuprous oxide | 708.5 |

Test Paint Preparation

The fumed silica is dispersed in the solvent with a moderate speed dispersator (Cowles-type). One-half of the polymer solution is slowly added, followed by the cuprous oxide. The resultant paste is ground in a water-cooled shot mill. The mill is washed with the remainder of the polymer solution and the washings are added into the paste. The well-mixed paint is passed through the shot mill once more and checked for a desired fineness of grind (Hegman gauge) of 4-6. The paint is adjusted for a final viscosity of 1,000 to 1,500 cps (Brookfield) with solvent.

The toxicant delivery system of the invention is capable of delivering toxicant at a substantially constant rate over the required time period. Moreover, the delivery rate is independent of the solubility characteristics of the toxicant, and consequently the minimum marine fouling prevention quantity of toxicant can be employed in the system. The avoidance of the requirement for excess toxicant can produce a significant cost savings, as compared to a system in which excess toxicant is used because of a non-uniform toxicant delivery rate and/or a need to optimize the hydrolysis rate of the system. As used herein, the term polymer hydrolysis rate refers to rate of production of carboxylic ions by 5 g of ground polymer film. The availability of carboxylic ions is dependent upon the concentration of the functional group in the polymer. The toxicant release rate can thus be customized, based on the polymer dissolution rate.

The paint composition has an erosion rate in moving seawater of at least 2 microns of paint film thickness per month, as measured by standard erosion measurements.

The paint systems of the invention is characterized by the recognition that the bulk of the paint is water insoluble and that only the surface of the film which is in contact with seawater hydrolyzes and thereby is slowly converted to a water-soluble or water-swellable form. This layer can be eroded away by moving seawater, releasing the physically bound toxicant (used to prevent fouling) and exposing a fresh paint surface. With this mechanism, the hydrolysis of the polymer and the rate at which the hydrolysis proceeds governs the ability of the paint film to erode and control fouling. This rate of hydrolysis can be measured under conditions which simulate the action of moving seawater as described above.

What is claimed is:

1. A antifouling paint for protecting marine surfaces, comprising in combination:
   (a) toxicant and
   (b) a film forming water insoluble, seawater erodible organotin free copolymer binder having recurring groups represented by the formula

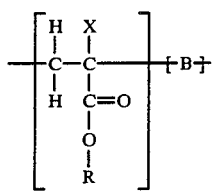

wherein

X is H or CH$_3$;

R is a substantially non-bioactive, organosilyl moiety, and B is the residue of an ethylenically unsaturated monomer.

2. The paint of claim 1 wherein R is —SiR$_n$R$_{3-n}$ or —Si(OR$_N$R$_{3-n}$)$_3$, where R' and R" are independently straight or branched chain alkyl C$_1$–C$_{10}$, or phenyl, and n=0–3.

3. The paint of claim 1 in which said organosilyl acrylate is selected from tributylsilyl acrylate, triphenylsilyl acrylate, phenyldimethylsilyl acrylate, diphenylmethylsilyl acrylate, tri-isopropylsilyl acrylate, or trimethylsilyl acrylate and the corresponding methacrylates.

4. The paint of claim 1 wherein said organosilyl acrylate is trimethylsilyl acrylate or methacrylate.

5. The paint of claim 1 wherein said organosilyl acrylate is phenyldimethylsilyl acrylate or methacrylate.

6. The paint of claim 1 wherein said organosilyl acrylate is diphenylmethylsilyl acrylate or methacrylate.

7. The paint of claim 1 wherein the organosilyl moiety is present in an amount of 10 to 80 parts on a mole basis of the copolymer binder.

8. The paint of claim 7 where said amount is 25 to 40 parts.

9. The paint of claim 1 where the erosion rate of the paint film is at least 2 microns per month.

10. A method of protecting a marine surface comprising coating said marine surface with an antifouling paint of claim 1.

11. A substantially organotin free, water insoluble, seawater erodible film forming copolymer, said copolymer having recurring groups represented by the formula

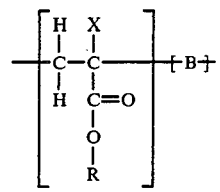

wherein

B is the residue of an ethylenically unsaturated monomer,

X is H or CH$_3$, and

R is an organosilyl moiety.

12. The copolymer of claim 11 wherein R is —SiR$_n$R$_{3-n}$ or Si(OR$_n$R$_{3-n}$)$_3$ and R' and R" are independently a straight or branched chain alkyl C$_1$–C$_{10}$, or phenyl, and n=0–3.

13. The copolymer of claim 11 which includes a tributylsilyl acrylate, triphenylsilyl acrylate, phenyldimethylsilyl acrylate, diphenylmethylsilyl acrylate, tri-isopropylsilyl acrylate, or trimethylsilyl acrylate or the methacrylates.

14. The copolymer of claim 11 which includes a trimethylsilyl acrylate or methacrylate.

15. The copolymer of claim 11 which includes a phenyldimethylsilyl acrylate or methacrylate.

16. The copolymer of claim 11 which includes a diphenylmethylsilyl acrylate or methacrylate.

17. The copolymer of claim 11 where the organosilyl moiety is present in an amount of 10 to 80 parts on a mole basis of the copolymer.

18. The copolymer of claim 11 where the organosilyl moiety is present in an amount of 25 to 40 parts on a mole basis of the copolymer.

19. The copolymer of claim 11 which has a hydrolysis rate of at least $5 \times 10^{-4}$ meq. per hour.

* * * * *